(12) United States Patent
Galamb

(10) Patent No.: US 10,017,072 B2
(45) Date of Patent: Jul. 10, 2018

(54) METHOD FOR THE TEMPERATURE CONTROL OF A TRACTION BATTERY ARRANGED IN A VEHICLE DURING A CHARGING PROCESS AT A CHARGING STATION, AND CHARGING STATION FOR PERFORMING SUCH A METHOD

(71) Applicants: Robert Bosch GmbH, Stuttgart (DE); Samsung SDI Co., Ltd., Yongin-si, Gyeonggi-do (KR)

(72) Inventor: Gergely Galamb, Traunstein (DE)

(73) Assignees: Roberts Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/783,520

(22) PCT Filed: Mar. 17, 2014

(86) PCT No.: PCT/EP2014/055227
§ 371 (c)(1),
(2) Date: Oct. 9, 2015

(87) PCT Pub. No.: WO2014/170074
PCT Pub. Date: Oct. 23, 2014

(65) Prior Publication Data
US 2016/0052421 A1 Feb. 25, 2016

(30) Foreign Application Priority Data

Apr. 18, 2013 (DE) .................. 10 2013 206 968
Mar. 4, 2014 (DE) .................. 10 2014 203 859

(51) Int. Cl.
*H02J 7/00* (2006.01)
*B60L 11/18* (2006.01)
(Continued)

(52) U.S. Cl.
CPC ....... *B60L 11/1874* (2013.01); *B60L 11/1816* (2013.01); *B60L 11/1824* (2013.01);
(Continued)

(58) Field of Classification Search
CPC .............................. H02J 7/0027; Y02T 90/14
(Continued)

(56) References Cited

U.S. PATENT DOCUMENTS 4,415,847 A   11/1983  Galloway
5,594,315 A *  1/1997  Ramos ................. B60L 11/182
                                                       320/108
(Continued)

FOREIGN PATENT DOCUMENTS

DE              44 08 961 C1    3/1995
DE       10 2010 007 975 A1     8/2011
(Continued)

OTHER PUBLICATIONS

International Search Report corresponding to PCT Application No. PCT/EP2014/055227, dated Oct. 10, 2014 and (German English language document) (5 pages).

*Primary Examiner* — Richard Isla Rodas
*Assistant Examiner* — Johali Torres Ruiz
(74) *Attorney, Agent, or Firm* — Maginot, Moore & Beck LLP

(57) ABSTRACT

An electrical contact assembly includes a first electrical contact having a first mating element, and a second electrical contact having a second mating element. The first and second electrical contacts are configured to mate together at the first and second mating elements such that the first and second mating elements engage each other at a contact interface. A distribution of contact pressure across the contact interface at least partially coincides with a distribution of electrical current flow across the contact interface.

14 Claims, 2 Drawing Sheets

(51) Int. Cl.
*B60K 1/00* (2006.01)
*B60K 1/04* (2006.01)

(52) U.S. Cl.
CPC ....... B60L 11/1877 (2013.01); B60L 11/1879 (2013.01); *B60K 2001/005* (2013.01); *B60K 2001/0438* (2013.01); *B60L 2230/10* (2013.01); *Y02T 10/7005* (2013.01); *Y02T 10/705* (2013.01); *Y02T 10/7088* (2013.01); *Y02T 90/121* (2013.01); *Y02T 90/14* (2013.01)

(58) Field of Classification Search
USPC .................................................. 320/109, 150
See application file for complete search history.

(56) References Cited

U.S. PATENT DOCUMENTS

| | | | | |
|---|---|---|---|---|
| 2006/0232929 | A1* | 10/2006 | Huang | .................... G06F 1/203 361/688 |
| 2010/0141206 | A1* | 6/2010 | Agassi | ..................... B60K 1/04 320/109 |
| 2011/0223459 | A1 | 9/2011 | Heichal | |
| 2011/0254503 | A1* | 10/2011 | Widmer | ................ B60L 11/182 320/108 |
| 2013/0029193 | A1* | 1/2013 | Dyer | ................... H01M 10/486 429/62 |
| 2013/0076902 | A1* | 3/2013 | Gao | ........................ B25J 9/042 348/148 |

FOREIGN PATENT DOCUMENTS

| | | |
|---|---|---|
| DE | 10 2011 082 566 A1 | 3/2013 |
| FR | 2 934 087 A3 | 1/2010 |
| JP | 2007-159359 A | 6/2007 |
| JP | 2011-114955 A | 6/2011 |
| JP | 2012-130177 A | 7/2012 |
| JP | 2012-216569 A | 11/2012 |
| JP | 2014-171381 A | 9/2014 |
| WO | 2007/118437 A1 | 10/2007 |
| WO | 2012001280 A1 | 1/2012 |

\* cited by examiner

METHOD FOR THE TEMPERATURE CONTROL OF A TRACTION BATTERY ARRANGED IN A VEHICLE DURING A CHARGING PROCESS AT A CHARGING STATION, AND CHARGING STATION FOR PERFORMING SUCH A METHOD

This application is a 35 U.S.C. § 371 National Stage Application of PCT/EP2014/055227, filed on Mar. 17, 2014, which claims the benefit of priority to Serial Numbers DE 10 2013 206 968.5, filed on Apr. 18, 2013 and DE 10 2014 203 859.6, filed on Mar. 4, 2014 in Germany, the disclosures of which are incorporated herein by reference in their entireties.

The disclosure relates to a method for the temperature control of a traction battery arranged in a vehicle during a charging process at a charging station, wherein the traction battery has at least one contacting surface for the thermal contacting of the traction battery.

The disclosure also relates to a charging station for performing such a method.

BACKGROUND

In electrically driven vehicles a rechargeable battery system referred to as a traction battery is used as energy source. Traction batteries of this type are rechargeable, in particular in the case of plug-in hybrid vehicles and in the case of electric vehicles at charging stations designed for this purpose, wherein a connection cable of the charging station is connected to a charging socket of the vehicle. Document DE 10 2010 007 975 A1 discloses the problem that, in the event of quick charging, high power losses occur, which lead to a high thermal loading of the traction battery or of the battery cells of the traction battery. For this reason it is necessary to control the temperature of the traction battery during the charging process in order to reduce the thermal loading of the traction battery during the charging process. Since a cooling device for the temperature control of the traction battery during the charging process requires complex technology, which additionally increases the overall weight of the vehicle, document DE 10 2010 007 975 A1 discloses a charging station for recharging a traction battery arranged in a vehicle, wherein the charging station have a cooling device with at least one coolant line connectable to a motor vehicle for feeding a coolant to the traction battery. The traction battery should has a cooling module with at least one cooling channel, wherein, during the charging process, the coolant fed by means of the coolant line of the charging station is to be conducted through the cooling channel of the traction battery.

In addition, a method and a device for the temperature control of a battery of an electric vehicle during a charging process at a charging station is known from document DE 44 08 961 C1, wherein, following connection of a battery-side temperature control fluid line to a charging station-side temperature control fluid source via a charging station-side connection line during the charging process, a temperature control fluid is conducted through the battery-side temperature control fluid line, and, the temperature control fluid is discharged from the battery-side fluid line prior to the decoupling of the charging station-side connection line from the battery-side temperature control fluid line.

Furthermore, a charging station for a vehicle battery, comprising a cooling device and feed lines for connection to a cooler for the vehicle battery, is known from document U.S. Pat. No. 4,415,847 A.

In addition, document FR 2 934 087 A3 discloses a cooling station with an energy source for charging a battery of a vehicle with corresponding connections for charging and cooling a vehicle battery.

These previously known solutions share the common feature that the battery to be recharged must have a cooling device with at least one cooling channel, through which a coolant can flow.

Proceeding from this prior art, the object of the present disclosure is to provide a method for the temperature control of a traction battery arranged in a vehicle during a charging process at a charging station, which method is simplified compared with the known methods and in particular makes it possible to further simplify the design of the traction battery and therefore to further reduce the vehicle weight.

SUMMARY

In order to achieve the object a method for the temperature control of a traction battery arranged in a vehicle during a charging process at a charging station is proposed, wherein the traction battery has at least one contacting surface for the thermal contacting of the traction battery and at least one cooling body provided by the charging station and thermally contacted with the at least one contacting surface of the traction battery, in such a way that an exchange of thermal energy between the at least one cooling body and the traction battery via the least one contacting surface thermally contacted with the least one cooling body is enabled and the traction battery is temperature-controlled by the at least one cooling body, at least during the charging process. Here, a temperature control of the traction battery is in particular a cooling of the traction battery. Furthermore, a temperature control of the traction battery is advantageously also a heat supply from the least one cooling body to the traction battery, i.e. a heating.

The at least one contacting surface of the traction battery is advantageously externally accessible. The at least one contacting surface of the traction battery is preferably arranged on the vehicle underbody. The at least one cooling body is advantageously brought detachably into thermal contact with the at least one contacting surface of the traction battery, i.e. the at least one cooling body is not arranged or installed permanently on the traction battery. In accordance with an advantageous embodiment, in order to improve the thermal contact between the at least one contacting surface and the at least one cooling body, a means for improving the thermal conductivity may be mounted on the at least one cooling body and/or the at least one contact surface of the traction battery. A means of this type in particular may be a heat-conducting gel and/or a heat-conducting paste.

Charging processes in the sense of the present disclosure in particular are quick charging processes. Traction batteries in particular are rechargeable batteries constructed from a plurality of electrically interconnected battery cells, in particular such as lithium-ion cells, which are formed as an energy store for driving electric vehicles. In particular, a traction battery is a battery comprising at least one battery cell and designed to provide the energy necessary for the operation of hybrid, plug-in hybrid or electric vehicles.

In the present disclosure the active cooling system for the traction battery is advantageously shifted from the vehicle into the charging station or into the charging column of a charging station. Due to the omission of the cooling system, the battery system of the vehicle is advantageously lighter and smaller per se. Since the present disclosure advantageously enables an omission of the complex cooling system from an at least partially electrically operated vehicle, the system reliability of such a vehicle is advantageously increased. Here, use is made of the knowledge that high thermal loading of the traction battery occurs only at high currents. Such high currents usually occur only briefly in driving mode of the vehicle, for example when pulling away at traffic lights, but occur over a longer period of time in the event of quick charging, in which case the maximum permissible current usually flows. The use of the traction battery as energy source for the vehicle is advantageously controlled by means of a control/regulation device in such a way that a critical heating of the traction battery in driving mode is prevented. Here, in particular in the event of quick charging, the traction battery is cooled in accordance with the disclosure by means of at least one external cooling body.

The proposed method according to the disclosure advantageously can be carried out without the traction battery having a cooling device and/or a cooling channel. A weight reduction of the traction battery and therefore of the vehicle advantageously can be attained as a result. In addition, the production of a corresponding traction battery is simplified, since the traction battery must have merely at least one contacting surface for thermally contacting the traction battery and does not need to have a cooling device or cooling channels. The costs of production of a corresponding traction battery are therefore advantageously also reduced. The method according to the disclosure is additionally simplified compared with the methods known in the prior art, since no coolant lines have to be connected to the traction battery in order to perform a charging process. In addition, the problem that coolant may leak, in particular following the charging process when the charging station-side coolant lines are separated from the traction battery, is avoided with the method according to the disclosure, wherein a leakage of coolant is undesirable if only for reasons of environmental protection.

In accordance with a particularly advantageous embodiment of the disclosure the least one cooling body is designed to control the temperature of the traction battery in such a way that the traction battery is cooled or the traction battery is heated. Here, in particular, a coolant is passed through the at least one cooling body, wherein the coolant temperature advantageously is adjustable. In accordance with an advantageous variant of the disclosure, in order to dissipate heat from the at least one cooling body, the at least one cooling body can be heated electrically. A supply of heat to the traction battery is particularly advantageous when the traction battery is to be charged and the traction battery here has a low temperature, for example a temperature of 10° C. A low temperature of the traction battery may then occur in particular when the traction battery has not been used previously or has only been used for a short time, for example only two minutes, at low ambient temperatures, in particular in frost. By heating the traction battery to an optimal charging temperature before a charging process and/or with the start of a charging process, the charging process here can be carried out advantageously in an accelerated manner. The temperature of the traction battery before and/or during a charging process is advantageously measured, preferably continuously, and the temperature of the at least one cooling body is controlled depending on the temperature of the traction battery. The charging station preferably has a corresponding control system for this purpose.

In particular, with the method according to the disclosure, in order to thermally contact the at least one cooling body with the at least one contacting surface of the traction battery, the at least one cooling body is moved toward the traction battery and/or the traction battery is moved toward the at least one cooling body. Here, the traction battery advantageously remains connected to the vehicle during the charging process. In particular, the least one cooling body is thus also moved toward the traction battery, and in addition the traction battery is moved toward the at least one cooling body, so that the at least one cooling body thermally contacts the at least one contacting surface of the traction battery. As the traction battery is moved, the vehicle is advantageously moved together with the traction battery. By means of at least one sensor it is advantageously monitored whether the at least one cooling body is thermally contacted with the at least one contacting surface of the traction battery. The movements are advantageously controlled by a control unit, preferably in an automated manner.

In accordance with an advantageous embodiment of the method according to the disclosure, prior to the start of the charging process, the traction battery is brought into a defined position relative to the position of the least one cooling body by positioning of the vehicle containing the traction battery, prior to the start of the charging process. Here, the position of the at least one cooling body prior to the start of the charging process is the position occupied by the at least one cooling body before the charging process has started and in particular before thermal contacting has occurred.

In particular, the vehicle containing the traction battery to be recharged is positioned with the contacting surface of the traction battery above the at least one cooling body before the at least one cooling body is thermally contacted with the at least one contacting surface of the traction battery. The thermal contacting of the at least one cooling body with the traction battery or the thermal contacting of the least one contacting surface of the traction battery by the at least one cooling body is advantageously simplified as a result. In particular, this is because thermal contacting for the temperature control of the traction battery during the charging process is thus enabled by means of a simple upward movement of the least one cooling body and/or a simple downward movement of the traction battery.

In particular, the driver of the vehicle containing the traction battery to be charged stops the vehicle within an accordingly indicated marking. In addition, in particular prior to the start of a charging process and in order to provide a further improved positioning of the traction battery relative to the position of the at least one cooling body prior to the start of the charging process, the position of the vehicle is detected with the use of a sensor system and the driver is instructed by means of a signaling device as to how the vehicle is to be stopped. For this purpose, the sensor system advantageously has at least one sensor, which detects the position of the contacting surface of the traction battery relative to the least one cooling body. The at least one contacting surface of the traction battery for this purpose advantageously has markings, which are detected by the at least one sensor, for example by a camera, such that the position of the traction battery relative to the position of the at least one cooling body prior to the start of the charging process is determined, advantageously on the basis of the detected markings. By bringing the traction battery into a defined position relative to the position of the at least one cooling body prior to the start of the charging process, a further simplified automation of the method for the temperature control of the traction battery during a charging process is advantageously enabled, in particular since the at least one contacting surface of the traction battery can be thermally contacted with the at least one cooling body automatically when the vehicle containing the traction battery to be charged is suitably stopped. The method is then triggered and performed in an automated manner advantageously when an electrical connection cable of the charging station is connected to the vehicle or the traction battery to be charged.

The vehicle containing the traction battery advantageously comprises a traction battery positioning device, wherein the traction battery is moved by means of the traction battery positioning device toward the at least one cooling body in order to thermally contact the at least one cooling body with the at least one contacting surface of the traction battery. The vehicle containing the traction battery is advantageously stopped previously such that the traction battery is arranged above the least one cooling body. The traction battery is advantageously then lowered by means of the traction battery positioning device, in such a way that the at least one cooling body thermally contacts the at least one contacting surface of the traction battery. The traction battery can be positioned by means of the traction battery positioning device in particular with use of at least one electric motor or pneumatically. The installation space or the housing of the traction battery advantageously contains the traction battery positioning device and/or the traction battery positioning device is part of the installation space or of the housing.

In accordance with a further advantageous embodiment of the method according to the disclosure the charging station comprises a vehicle positioning device, wherein the vehicle containing the traction battery to be recharged is stopped on the vehicle positioning device, and the vehicle is moved toward the at least one cooling body by means of the vehicle positioning device in order to thermally contact the at least one cooling body with the at least one contacting surface of the traction battery. In particular, the vehicle positioning device is formed in the manner of a lifting platform. In particular, the vehicle positioning device comprises at least one supporting surface for the wheels of the vehicle containing the traction battery, on which supporting surface the vehicle is advantageously positioned in such a way that each of the wheels is on the at least one supporting surface. The at least one supporting surface here is vertically adjustable in a variable manner, i.e. the at least one supporting surface in particular can be lowered and raised. Here, the traction battery is advantageously brought by the corresponding movement of the vehicle into the desired position, in which the at least one contacting surface of the traction battery is advantageously thermally contacted with the at least one cooling body.

In accordance with a further advantageous embodiment of the method according to the disclosure the at least one cooling body may adopt at least one first position and at least one second position, wherein the at least one cooling body for the temperature control of the traction battery is brought from the first position into the second position and the at least one cooling body in the second position thermally contacts the at least one contacting surface of the traction battery. In particular, in accordance with an advantageous variant, exclusively the at least one cooling body is moved toward the traction battery in order to thermally contact the at least one contact surface of the traction battery. In particular, a method for the temperature control of a traction battery arranged in a vehicle during a charging process at a charging station is thus proposed, wherein the traction battery has at least one contacting surface for thermally contacting the traction battery, and at least one cooling body provided by the charging station can adopt at least one first position and at least one second position, wherein the at least one cooling body for the temperature control of the traction battery is brought from the first position into the second position, and the at least one cooling body in the second position thermally contacts the at least one contacting surface of the traction battery, in such a way that an exchange of thermal energy between the at least one cooling body and the traction battery via the at least one contacting surface thermally contacted with the at least one cooling body is enabled and the traction battery is temperature-controlled by means of the at least one cooling body, at least during the charging process.

In the proposed method according to the present disclosure the at least one cooling body is advantageously brought from the second position into the first position following the charging process. The at least one cooling body is thus separated again from the traction battery after the charging process. For this purpose, there is advantageously no need for any separation from coolant lines, whereby the method advantageously is simplified compared with previously known methods.

In accordance with an advantageous embodiment of the method the at least one cooling body is cooled in the first position, wherein the at least one cooling body comprises means for storing thermal energy, such that the at least one cooling body forms a heat sink in the event of thermal contacting of the at least one contacting surface of the traction battery. In this embodiment of the method there is thus no active cooling of the at least one cooling body during the charging process. Instead, the thermal capacity of the at least one cooling body is used to cool the traction battery. Here, the at least one cooling body is advantageously formed at least partially as a latent heat store, for example in the manner of a cold pack. Here, the at least one cooling body is preferably brought in the first position to a target temperature, which in the event of the temperature control of the traction battery by means of the at least one cooling body during the charging process ensures a sufficiently large temperature difference between the at least one cooling body and the traction battery over the entire charging process, such that heat lost during the charging process of the traction battery is dissipated via the at least one cooling body.

In accordance with a further advantageous embodiment of the method, a coolant is passed through at least part of the least one cooling body in the second position, such that the at least one cooling body forms a heat sink in the event of thermal contacting of the at least one contacting surface of the traction battery. The coolant is temperature-controlled by means of a cooling system advantageously controlled or regulated by the charging station. The charging station preferably advantageously provides a control system that keeps the coolant at a constant temperature. The traction battery is advantageously cooled uniformly in this way.

In accordance with a further embodiment of the method according to the disclosure the traction battery is brought into a defined position relative to the first position of the at least one cooling body by positioning of the vehicle containing the traction battery. In particular, the driver of the vehicle containing the traction battery to be charged stops the vehicle within an accordingly indicated marking. In addition, for further improved positioning of the traction battery relative to the first position of the at least one cooling body, the position of the vehicle may be detected with use of a sensor system, and the driver may be informed by means of a signaling device as to how the vehicle is to be stopped. The sensor system for this purpose advantageously has at least one sensor, which detects the position of the contacting surface of the traction battery relative to the at least one cooling body. For this purpose, markings may be arranged in and/or on the at least one contacting surface of the traction battery, which markings are detected by the at least one sensor, for example by a camera, such that the position of the traction battery relative to the first position of the at least one cooling body can be determined on the basis of the detected markings. By bringing the traction battery into a defined position relative to the first position of the at least one cooling body, a more simplified automation of the method for the temperature control of the traction battery during a charging process is advantageously enabled, since in particular the at least one contacting surface of the traction battery can be thermally contacted with the at least one cooling body automatically when the vehicle containing the traction battery to be charged is suitably stopped. The method can be triggered and performed in an automated manner, in particular when an electrical connection cable of the charging station is connected to the vehicle or the traction battery to be charged.

In accordance with a further advantageous embodiment of the method according to the disclosure, the at least one cooling body is arranged on a controllable positioning device, wherein the positioning device is controlled in such a way that the at least one heat sink for the temperature control of the traction battery is brought from the first position into the second position by the positioning device. The positioning device here is preferably controlled by a control device, particularly preferably by a control device of the charging station. By means of at least one sensor, it is advantageously monitored whether the at least one heat sink is thermally contacted with the at least one contacting surface of the traction battery. The at least one contacting surface and the at least one cooling body are advantageously congruent in the region of the contact. A particularly good exchange of thermal energy is thus advantageously enabled.

In particular, the positioning device is a lifting device, and the at least one cooling body is arranged in the first position close to the ground or is at least partially recessed in the ground, wherein the vehicle containing the traction battery to be recharged is positioned with the at least one contacting surface of the traction battery above the lifting device with the at least one cooling body, and the at least one cooling body is brought by means of the lifting device into the second position. The at least one cooling body is advantageously brought automatically by means of the lifting device into the second position when the traction battery has been brought into a defined position relative to the first position of the at least one cooling body by positioning of the vehicle containing the traction battery. A trigger for bringing the at least one cooling body into the second position is advantageously the connection of the traction battery to a connection cable of the charging station. In accordance with a further advantageous embodiment of the disclosure the at least one cooling body may be arranged movably on the lifting device, preferably in the manner of a positioning table, such that the arrangement of the at least one cooling body relative to the at least one contacting surface of the traction battery advantageously is readjustable. In order to carry out the adjustment, a sensor system arranged on the least one cooling body and/or on the positioning device is advantageously provided and is designed to detect the position of the at least one cooling body relative to the at least one contacting surface of the traction battery and to position the at least one cooling body in such a way that complete contacting of the at least one cooling body with the at least one contacting surface of the traction battery is enabled. The method according to the disclosure may therefore comprise, in particular as a further method step, a positioning of the least one cooling body relative to the at least one contacting surface of the traction battery, preferably in that the position of the cooling body relative to the contacting surface of the traction battery is determined by means of at least one sensor and at least one evaluation device, and the at least one cooling body is brought into the corresponding position by means of corresponding adjustment devices.

In accordance with a further embodiment of the disclosure the at least one cooling body is detachably connected to the at least one contacting surface of the traction battery in the second position. A further improvement of the thermal contacting between the at least one cooling body and the at least one contacting surface of the traction battery can be attained advantageously as a result. In particular, the at least one contacting surface may be formed at least partially magnetically, and the at least one cooling body may have at least one magnet, preferably at least one electromagnet, such that the detachable connection is produced with use of the magnetic force of attraction.

In accordance with a further advantageous embodiment of the disclosure the traction battery and/or the at least one contacting surface of the traction battery has/have at least one retaining means for holding the at least one cooling body, wherein the at least one cooling body is brought into thermal contact with the at least one contacting surface with use of the at least one retaining means. An embodiment of this type is then advantageous in particular when the at least one cooling body is not to be thermally contacted in an automated manner with the at least one contacting surface. In particular, the at least one retaining means may be formed as a compartment for receiving the at least one cooling body, wherein the at least one cooling body is brought into thermal contact with the at least one contacting surface of the traction battery by being introduced into the compartment. The retaining means formed as a compartment is advantageously matched to the outer shape of the at least one cooling body, such that the at least one cooling body can be introduced into the compartment advantageously substantially with an accurate fit. Here, the at least one cooling body is formed in particular as a latent heat store, preferably in the manner of a cool pack. One or more latent heat stores of this type is/are advantageously provided by the charging station and is/are introduced into the compartment either manually, for example by the driver of the vehicle containing the traction battery to be charged, or in an automated manner by means of a positioning device. A sensor system advantageously identifies whether a latent heat store is introduced into the compartment. Only when a latent heat store is introduced into the compartment is a recharging of the traction battery enabled. The latent heat store is removed again following the charging process.

In accordance with a further advantageous embodiment of the method according to the disclosure the at least one cooling body is cooled prior to the start of a charging process and/or following the end of a charging process, wherein the at least one cooling body comprises means for storing thermal energy, such that the at least one cooling body forms a heat sink in the event of thermal contacting of the at least one contacting surface of the traction battery. In particular, a variant is provided here, in which, during the charging process, there is no active cooling of the at least one cooling body. Instead, the thermal capacity of the at least one cooling body is used to cool the traction battery. The at least one cooling body is formed here advantageously at least partially as a latent heat store, for example in the manner of a cool pack. In particular, the at least one cooling body for this purpose has a liquid-filled cavity, in particular a cavity filled with a coolant. Here, the at least one cooling body is preferably brought to a target temperature prior to the start of a charging process and/or following the end of a charging process, which, in the event of the temperature control of the traction battery by means of the at least one cooling body during the charging process, ensures a sufficiently large temperature difference between the at least one cooling body and the traction battery over the entire charging process, such that heat lost during the charging process of the traction battery is dissipated via the at least one cooling body.

A coolant is particularly preferably passed through at least part of the at least one cooling body during a charging process, such that the at least one cooling body forms a heat sink in the event of thermal contacting of the at least one contacting surface of the traction battery. The coolant is advantageously temperature-controlled by means of a cooling system, which is advantageously controlled or regulated by the charging station. A control system, preferably a control system provided by the charging station, is advantageously provided, wherein the control system keeps the coolant at a constant temperature. The traction battery is advantageously cooled uniformly in this way.

In order to solve the object mentioned in the introduction, a charging station for recharging a traction battery arranged in a vehicle is also proposed with the present disclosure, wherein the traction battery has at least one contacting surface for thermally contacting the traction battery, and the charging station has means for carrying out a method according to the disclosure. Here, the charging station is a quick charging station in particular. The charging station for recharging a traction battery arranged in a vehicle in particular has at least one cooling body for the temperature control of the traction battery to be charged. The at least one cooling body is designed here in particular in order to cool or to heat the traction battery. The charging station preferably has a control device, which is designed to control the temperature of the at least one cooling body, in particular depending on the temperature of the traction battery. Here, the charging station preferably has a temperature detection device, which is designed to detect the temperature of the traction battery.

In accordance with a preferred embodiment of the charging station according to the disclosure the charging station comprises a positioning device, on which the at least one cooling body is arranged, wherein the at least one cooling body can be brought by means of the positioning device into at least one first position and into at least one second position, wherein the at least one cooling body in the at least one second position can be thermally contacted with the at least one contacting surface of the traction battery to be charged. The charging station advantageously also comprises at least one sensor, in particular at least one camera, which can determine the position of a traction battery to be charged relative to the cooling body of the charging station. By means of the positioning device of the charging station and/or at least one adjustment device preferably arranged on the positioning device, a positioning, preferably an automatic positioning, of the at least one cooling body into the at least one second position is advantageously enabled in such a way that the at least one contacting surface of the traction battery can be thermally contacted, preferably can be fully contacted, by the at least one cooling body. In accordance with a further advantageous embodiment the positioning device is a lifting device, wherein the at least one cooling body is arranged close to the ground in the first position or is recessed at least partially in the ground, and wherein the lifting device is designed to bring the at least one cooling the body from the first position into the second position for thermal contacting.

In accordance with a further advantageous embodiment of the disclosure the charging station comprises a vehicle positioning device. Here, the vehicle positioning device is advantageously designed to move a vehicle stopped on the vehicle positioning device and containing the traction battery to be recharged toward the at least one cooling body for thermal contacting of the at least one cooling body with the at least one contacting surface of the traction battery. Here, the vehicle positioning device is advantageously connected to sensors for detecting the position of the traction battery with respect to the at least one cooling body, wherein the thermal contacting is preferably established in an automated manner, in particular with use of the sensor data by means of the vehicle positioning device.

BRIEF DESCRIPTION OF THE DRAWINGS

Further advantageous particulars, features and design details of the method according to the disclosure for the temperature control of a traction battery arranged in a vehicle during a charging process at a charging station according to the disclosure and also of a charging station according to the disclosure will be explained in greater detail in conjunction with the exemplary embodiments illustrated in the figures, in which.

DETAILED DESCRIPTION

Figure 1:
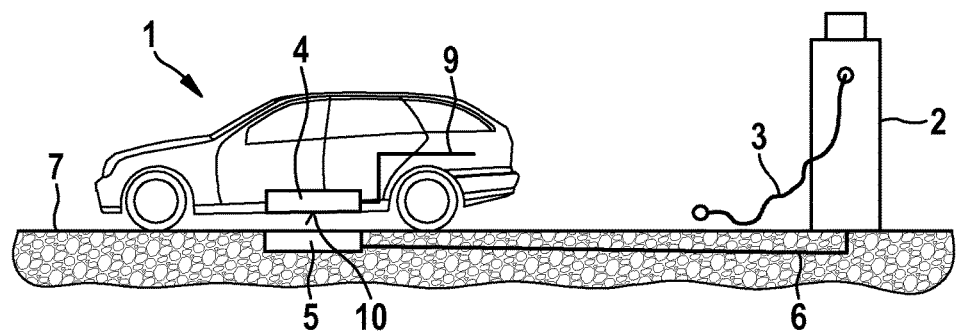
FIG. 1 in a schematic illustration shows an exemplary embodiment of the disclosure, wherein a traction battery arranged in a vehicle is to be charged at a charging station.

FIG. 1 shows an electric vehicle 1 with a traction battery 4. Furthermore, FIG. 1 illustrates a charging station 2, which in particular enables a quick charging of a traction battery 4 of a vehicle 1. Here, the charging station 2 has a connection line 3 for the electrically conductive connection of the charging station 2 to the traction battery 4. Furthermore, the charging station 2 comprises a cooling body 5 recessed into the ground 7 for the temperature control of a traction battery to be charged and arranged in a vehicle during a charging process at the charging station 2. Here, a coolant (not illustrated explicitly in FIG. 1) is passed through the cooling body 5. Here, the cooling body 5 is connected via a coolant line 6 to a cooling apparatus (not illustrated explicitly in FIG. 1) provided by the charging station 2, wherein the cooling apparatus controls the temperature of the coolant to a predefined target value.

Figure 2:
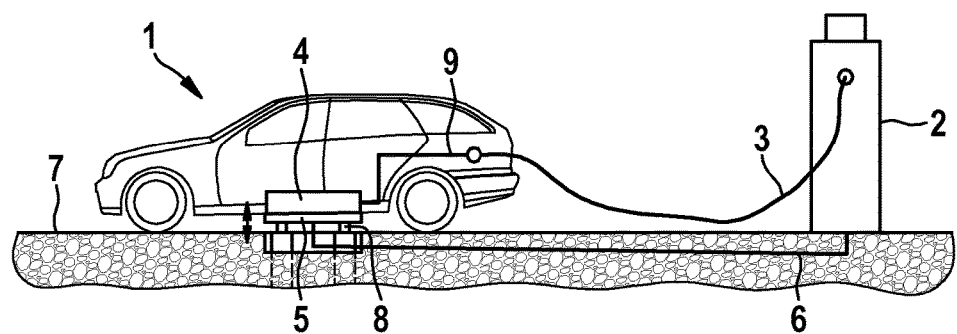
FIG. 2 in a schematic illustration shows an exemplary embodiment of the disclosure, wherein a traction battery arranged in a vehicle is temperature-controlled during a charging process.

The charging station 2 additionally has a positioning device (not illustrated explicitly in FIG. 1), on which the cooling body 5 is arranged. The positioning device in the illustrated exemplary embodiments is a lifting device, which is designed to bring the cooling body 5 into a first position and into a second position. In FIG. 1 the cooling body 5 is illustrated in the first position. In FIG. 2 the cooling body 5 is illustrated in the second position. The lifting device is designed to move the cooling body 5 upwardly from the first position, such that the cooling body 5 can adopt the second position, and to lower the cooling body 5 again from the second position, such that the cooling body 5 can adopt the first position again. In the second position the cooling body 5 can be thermally contacted with the contacting surface of a traction battery 4.

Prior to the start of a charging process with use of the charging station 2, the traction battery 4 is first brought into a defined position relative to the first position of the cooling body 5 by positioning of the vehicle 1 containing the traction battery 4. The illustrated exemplary embodiment the defined position is then reached when the traction battery 4 is arranged above the cooling body 5. So that the traction battery 4 or the vehicle 1 is stopped suitably, markings (not illustrated explicitly in FIG. 1 and FIG. 2) may be provided on the ground 7, and the driver of the vehicle 1 can orientate themself with said markings when positioning the vehicle 1. In order to position the vehicle 1 more precisely, sensors (not illustrated explicitly in FIG. 1 and FIG. 2) can be recessed in the ground 7 and/or in the cooling body 5, which sensors can detect the position of the traction battery 4 on the basis of markings arranged on the traction battery 4. Data detected by the sensors is transmitted to the charging station 2, which signals to the driver via a signaling device, for example a display or a speech output (not illustrated explicitly in FIG. 1 and FIG. 2) whether, and if so how, the vehicle position must be corrected before the charging process can start.

For the temperature control the traction battery 4 during the charging process, the traction battery 4 has a contacting surface 10 for thermally contacting the traction battery 4. The contacting surface 10 of the traction battery 4 extends in the exemplary embodiments illustrated in FIG. 1 and FIG. 2 over the entire lower surface of the traction battery 4. Here, the contacting surface is freely accessible externally. In a variant (not illustrated) protection against soiling is provided, for example as a plastic covering, which is removed from the contacting surface, preferably automatically, prior to a charging process, for example in that the protection retracts automatically with use of an adjustment device.

Once the vehicle 1 has stopped at a suitable position, as illustrated in FIG. 1 and FIG. 2, the traction battery 4, as illustrated in FIG. 2, is electrically conductively connected to the charging station 2 via a connection line 9 within the vehicle by means of the connection line 3. Here, the connection of the traction battery 4 to the charging station 2 is the trigger for bringing the cooling body 5 by means of the lifting device 8 into the second position, wherein the cooling body 5 thermally contacts the contacting surface of the traction battery 4 in the second position.

In the exemplary embodiment illustrated in FIG. 2, the lifting device 8 is provided pneumatically. Here, the cooling body 5 may be moved upward and downward with use of the lifting device 8, as illustrated symbolically by the double-headed arrow illustrated in FIG. 2. The cooling body 5 thus may be moved with use of the lifting device 8 in particular between the first position, in which the cooling body 5 is recessed in the ground 7 (as shown in FIG. 1), and the second position, in which the cooling body 5 thermally contacts the contacting surface of the traction battery 4 (as shown in FIG. 2). The extension of the cooling body 5 may then be stopped in particular when a certain pressure limit value, which acts on the cooling body 5 when contacting the traction battery, is reached. The pressure acting on the cooling body 5 is detected here by at least one sensor (not illustrated explicitly in FIG. 1 and FIG. 2).

When the cooling body 5 is located in the second position, such that the cooling body 5 thermally contacts the contacting surface 10 of the traction battery 4, a coolant (not illustrated explicitly in FIG. 2), for example the coolant R1234yf, is passed through the cooling body 5. The cooling body 5 thus forms a heat sink, such that lost heat produced at the charging station 2 in the event of quick charging of the traction battery 4 can be dissipated to the coolant via the cooling body 5.

In a variant not illustrated in FIG. 1 and FIG. 2 the cooling body 5 has means for storing thermal energy, in particular at least one latent heat store, preferably a latent heat store formed in the manner of a cool pack, which forms a heat sink in the event of thermal contacting of the contacting surface 10 of the traction battery 4. A cooling body 5 of this type is not actively cooled during the thermal contacting with the traction battery 4. The cooling of a cooling body 5 of this type and therefore the bringing of this cooling body 5 to a target temperature is implemented by active cooling recessed in the ground 7 when the cooling body 5 adopts the first position, i.e. is recessed at least partially in the ground 7.

If the charging process of the traction battery 4 is complete, the cooling body 5 is brought again into the first position from the second position with use of the lifting device 8. This may be triggered for example by separation of the connection 3 of the charging station 2 from the traction battery 4. The cooling body 5 is detachably connected in the second position to the contacting surface 10 of the traction battery 4 during the entire charging process of the traction battery 4. The traction battery 4 itself does not have a cooling body or any means for cooling the battery during a charging process.

In particular for non-public charging stations, the traction battery or the contacting surface of the traction battery may have a retaining means for holding at least one cooling body in order to reduce the technical complexity of the charging station, in particular the technical complexity with regard to an automatic thermal contacting of the contacting surface of a traction battery with a cooling body. The cooling body, preferably a cooling body with means for storing thermal energy, such as a latent heat store that has been cooled to a low temperature value, is then brought into thermal contact with the contacting surface of the traction battery with use of the retaining means, preferably in that an accordingly designed cooling body is inserted into the retaining means. Following the charging process the cooling body may then be removed again from the retaining means and brought into a cooling device, which cools the cooling body again to a lower temperature.

A further advantageous exemplary embodiment of the disclosure will be explained in greater detail in conjunction with FIG. 3 and FIG. 4. The charging station 2 here comprises a vehicle positioning device 11, which can be formed similarly to a lifting platform for a vehicle.

The charging station 2 also comprises a cooling body 5. This is preferably integrated fixedly in the ground 7, and a coolant (not explicitly illustrated in FIG. 3 and FIG. 4) is passed through said cooling body via a coolant line 6. The coolant temperature is controlled here advantageously by a cooling system (not explicitly illustrated in FIG. 3 and FIG. 4) of the charging station 2.

Figure 3:
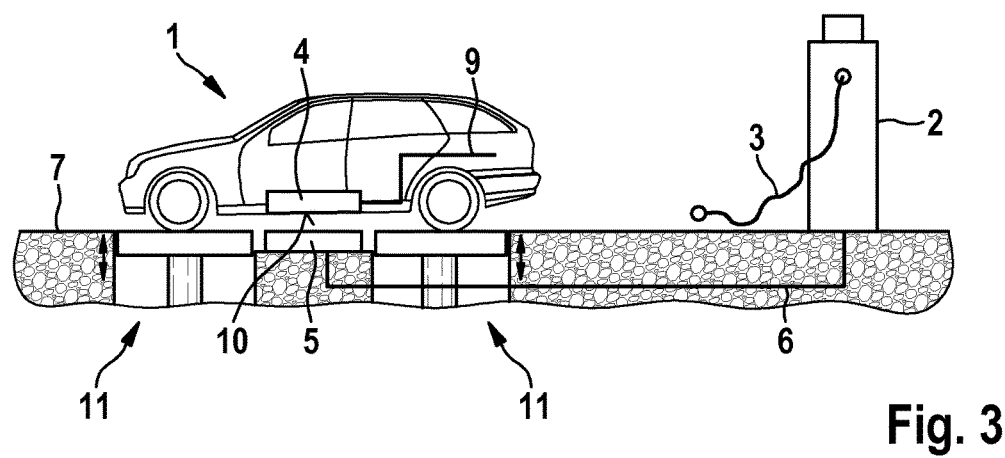
FIG. 3 in a schematic illustration shows a further exemplary embodiment of the disclosure, wherein a traction battery arranged in a vehicle is to be charged at a charging station.
Figure 4:
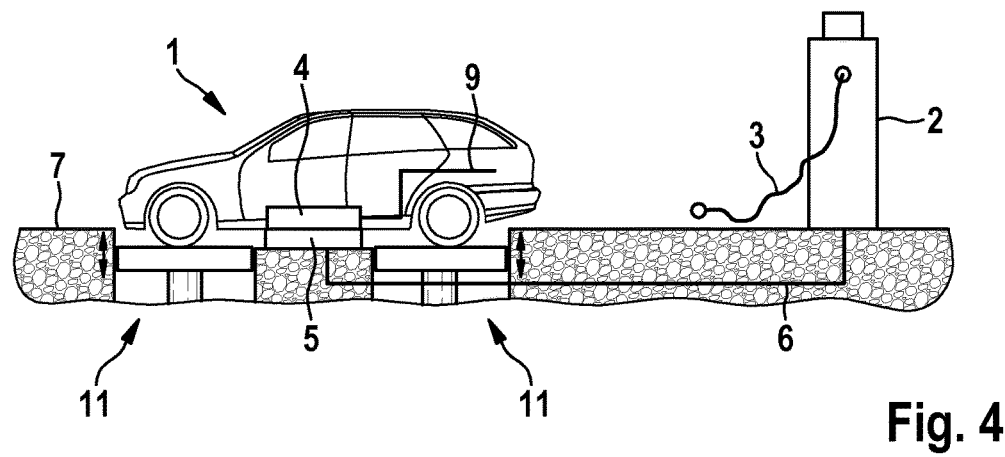
FIG. 4 in a schematic illustration shows a further exemplary embodiment of the disclosure, wherein a traction battery arranged in a vehicle is to be charged at a charging station.

Here, a vehicle 1, as illustrated in FIG. 3 and FIG. 4, is stopped on the vehicle positioning device 11. The vehicle 1 here has a traction battery 4 to be recharged, which is arranged in such a way that a contacting surface 10 of the traction battery 4 for thermally contacting the traction battery 4 with at least one cooling body 5 is directed toward the ground 7 and is freely accessible.

The vehicle positioning device 11 advantageously has a supporting surface for the front wheels and a supporting surface for the rear wheels of the vehicle 1, wherein the vehicle 1 is positioned in such a way that the rear wheels rest on one supporting surface of the vehicle positioning device 11 and the front wheels rest on a further supporting surface of the vehicle positioning device 11. The vehicle positioning device 11 or the supporting surfaces of the vehicle positioning device 11 are vertically adjustable here in a variable manner, as illustrated symbolically in FIG. 3 and FIG. 4 by the double-headed arrows. This means that the supporting surfaces can be lowered and raised.

The vehicle 1 containing the traction battery 4 to be recharged is positioned here, as illustrated in FIG. 3, with the contacting surface 10 of the traction battery 4 above the cooling body 5 before the cooling body 5 is thermally contacted with the contacting surface 10 of the traction battery 4.

Once the vehicle 1 is positioned as in FIG. 3 the traction battery 4 is moved together with the vehicle 1 toward the cooling body 5 by lowering the vehicle positioning device 11 with the vehicle 1 positioned thereon. The vehicle positioning device 11 with the vehicle 1 located thereon is lowered here until the contacting surface 10 of the traction battery 4 has thermally contacted the cooling body 5 in such a way that an exchange of thermal energy between the cooling body 5 and the traction battery 4 via the contacting surface 10 thermally contacted with the cooling body 5 is enabled and the traction battery 4 is temperature-controlled by the cooling body 5, at least during a charging process provided subsequently to the connection of the connection line 3 to the vehicle-side connection line 9.

The exemplary embodiments illustrated in the figures and explained in conjunction therewith serve to explain the disclosure and do not limit the disclosure.

The invention claimed is:

1. A method for the temperature control of a traction battery arranged in a vehicle during a charging process at a charging station, wherein the traction battery has at least one contacting surface configured to thermally contact the traction battery, the method comprising:
thermally contacting at least one cooling body provided by the charging station with the at least one contacting surface of the traction battery such that an exchange of thermal energy between the at least one cooling body and the traction battery via the least one contacting surface thermally contacted with the at least one cooling body is enabled without the traction battery having a cooling device or a cooling channel and the traction battery is temperature-controlled by the at least one cooling body, at least during the charging process.

2. The method as claimed in claim 1, further comprising:
moving the at least one cooling body toward the traction battery and/or moving the traction battery toward the at least one cooling body to thermally contact the at least one cooling body with the at least one contacting surface of the traction battery,
wherein the traction battery remains connected to the vehicle during the charging process.

3. The method as claimed in claim 1, further comprising:
prior to beginning the charging process, bringing the traction battery into a defined position relative to a position of the least one cooling body by positioning the vehicle containing the traction battery, prior to beginning the charging process.

4. The method as claimed in claim 1, wherein:
the vehicle containing the traction battery comprises a traction battery positioning device, and the traction battery is moved by the traction battery positioning device toward the at least one cooling body to thermally contact the at least one cooling body with the at least one contacting surface of the traction battery.

5. The method as claimed in claim 1, further comprising:
stopping the vehicle containing the traction battery to be recharged on a vehicle positioning device of the charging station, and
moving the vehicle toward the at least one cooling body via the vehicle positioning device in order to thermally contact the at least one cooling body with the at least one contacting surface of the traction battery.

6. The method as claimed in claim 1, wherein:
the at least one cooling body is configured to adopt at least one first position and at least one second position, and
the at least one cooling body for the temperature control of the traction battery is brought from the at least one first position into the at least one second position and the at least one cooling body in the at least one second position thermally contacts the at least one contacting surface of the traction battery.

7. The method as claimed in claim 6, wherein the at least one cooling body is brought from the at least one second position into the at least one first position following the charging process.

8. The method as claimed in claim 6, further comprising:
arranging the at least one cooling body on a controllable positioning device, wherein the positioning device is controlled such that the at least one cooling body is brought by the positioning device from the at least one first position into the at least one second position for the temperature control of the traction battery.

9. The method as claimed in claim 8, wherein:
the positioning device is a lifting device and the at least one cooling body is arranged in the at least one first position close to the ground or is at least partially recessed in the ground,
the vehicle containing the traction battery to be recharged is positioned with the at least one contacting surface of the traction battery above the lifting device with the at least one cooling body, and
the at least one cooling body is moved upwardly by the lifting device into the at least one second position.

10. The method as claimed in claim 6, wherein the at least one cooling body is detachably connected to the at least one contacting surface of the traction battery in the at least one second position.

11. The method as claimed in claim 1, wherein:
at least one of the traction battery and the at least one contacting surface of the traction battery has at least one retaining mechanism configured to hold the at least one cooling body, and
the at least one cooling body is brought into thermal contact with the at least one contacting surface with use of the at least one retaining mechanism.

12. The method as claimed in claim 1, wherein:
the at least one cooling body is cooled prior to beginning a charging process and/or following an end of a charging process, and
the at least one cooling body comprises a mechanism configured to store thermal energy, such that the at least one cooling body forms a heat sink in the event of thermal contacting of the at least one contacting surface of the traction battery.

13. The method as claimed in claim 1, further comprising:
passing a coolant through at least part of the at least one cooling body during a charging process; and
transferring thermal energy from the at least one cooling body to the passing coolant, such that the at least one cooling body forms a heat sink in the event of thermal contacting of the at least one contacting surface of the traction battery.

14. A charging station for recharging a traction battery arranged in a vehicle, wherein the traction battery has at least one contacting surface for thermally contacting the traction battery, the charging station comprising:
at least one cooling body configured to thermally contact the at least one contact surface of the traction battery such that an exchange of thermal energy between the at least one cooling body and the traction battery via the at least one contact surface thermally contacted with the at least one cooling body is enabled without the traction battery having a cooling device or a cooling channel and the traction battery is temperature-controlled by the at least one cooling body, at least during a charging process.

* * * * *